UNITED STATES PATENT OFFICE.

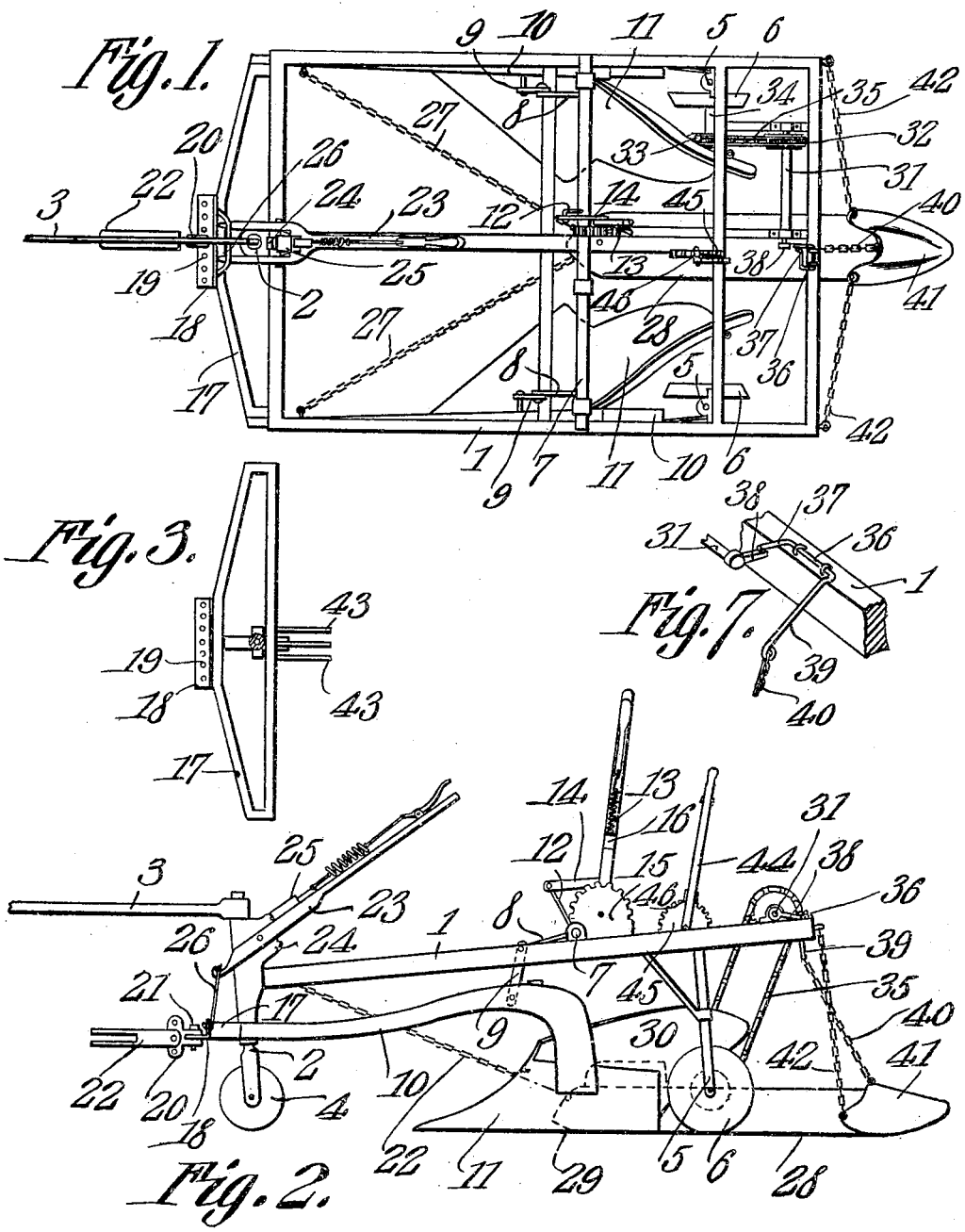

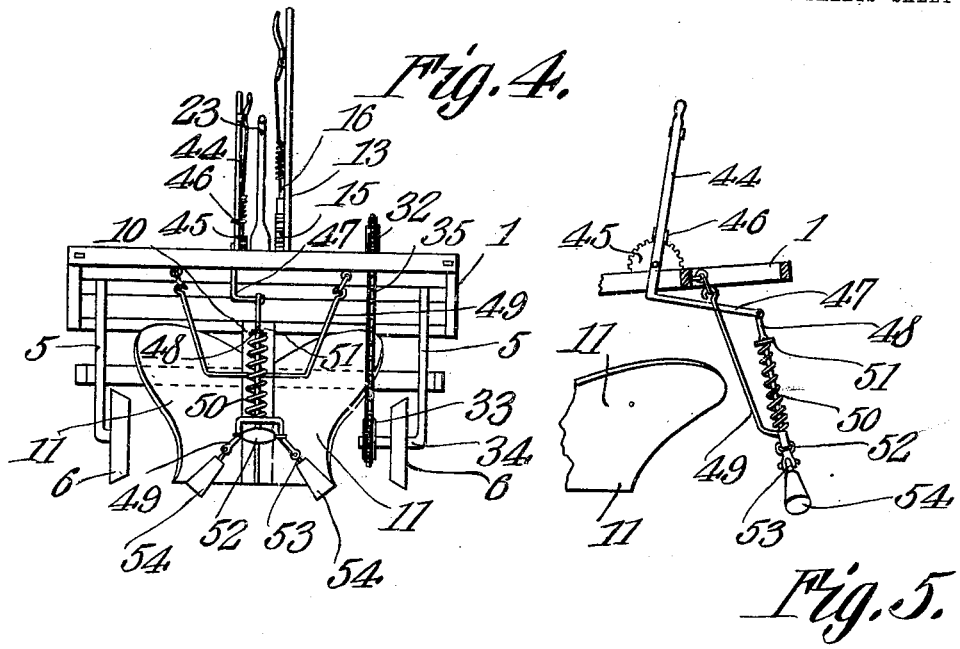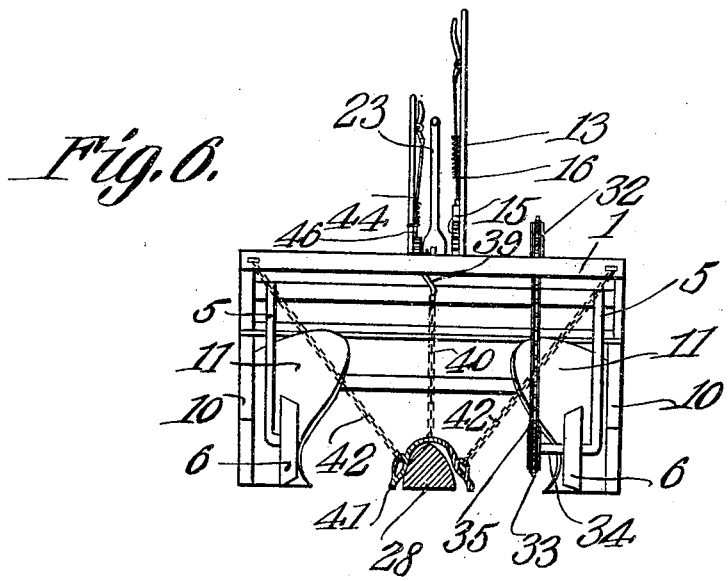

ALBERT G. HERMANSON, OF PRESCOTT, WISCONSIN.

MOLE-PLOW.

962,957.  Specification of Letters Patent.  Patented June 28, 1910.

Application filed March 26, 1909. Serial No. 485,911.

*To all whom it may concern:*

Be it known that I, ALBERT G. HERMANSON, a citizen of the United States, residing at Prescott, in the county of Pierce and State of Wisconsin, have invented a new and useful Mole-Plow, of which the following is a specification.

This invention has relation to mole plows, and it consists in the novel construction and arrangement of its parts, as hereinafter shown and described.

The object of the invention is to provide a plow which is adapted to form a continuous tunnel of earth at the surface of the soil, and also to provide means for slicking or smoothing the top and sides of the tunnel during the process of forming the same.

With the above objects in view the plow consists of a frame, to the opposite sides of which are attached mold board plows, and a core is located between the said plows and is connected with the frame. A slicker, or means for smoothing the top and sides of the tunnel, trails behind the frame and the said core, and means is provided for giving the said slicker slight vertical movement as it operates upon the top and sides of the tunnel, in order to prevent the same from becoming tangled in the soil, or accumulating trash and the like.

In the accompanying drawings:—Figure 1 is a top plan view of the plow. Fig. 2 is a side elevation of the same. Fig. 3 is a detail plan view of the intermediate forward portion of the frame of the plow. Fig. 4 is a rear elevation of the plow, showing a rear-arrangement of the parts thereof. Fig. 5 is a detail side elevation of a clod-crusher, which may be used in conjunction with the plow. Fig. 6 is a vertical transverse sectional view of the plow, illustrating the manner in which the tunnel as indicated is formed in the soil. Fig. 7 is a detail perspective view of a portion of the plow.

The plow includes a frame 1, at the forward end of which is journaled a standard 2. A guiding tongue 3 is attached to the upper end of the standard 2, and a ground wheel 4 is journaled at the lower end of the said standard 2. Standards 5 depend from the rear portion of the frame 1, and ground wheels 6 are journaled at the lower ends of the said standards 5. The peripheries of the wheels 6 are beveled or cone-shaped as indicated in Fig. 1 of the drawings.

A transversely disposed shaft 7 is journaled upon the frame 1 and is provided with laterally projecting arms 8. Links 9 are pivotally connected at their upper ends with the outer extremities of the arms 8, and the lower ends of the said links 9 are pivotally connected with the rear portions of plow beams 10. The said beams 10 carry at their rear ends mold boards and shares 11, of the usual mold board type. An arm 12 is mounted upon the shaft 7, and a lever 13 is fulcrumed upon the frame 1. The said lever 13 is provided with an arm 14, the outer end of which is pivotally connected with the outer or upper end of the arm 12. A gear segment 15 is concentrically arranged with relation to the fulcrum of the lever 13, and the said lever is provided with a spring-actuated pawl 16, which is adapted to engage the teeth of the segment 15 and hold the said lever in an adjusted position. The forward ends of the beams 10 are attached to the ends of a cross-bar 17, which lies transversely with relation to the frame 1, and which, at an intermediate point, is provided with a forwardly disposed shelf 18 which in turn is provided with a series of perforations 19. A clevis 20 is mounted upon the said shelf 19, and a bolt 21 passes transversely through the shank of the clevis and any one of the perforations 19 in the plate 18 and forms means whereby the said clevis may be adjustably positioned upon the said plate. A coupling 22 is pivotally connected at its rear end with the clevis 20, and is adapted to support a single or double tree of a draft team. A lever 23 is fulcrumed upon the forward portion of the frame 1, and a gear segment 24 is concentrically arranged with relation to the fulcrum point of the said lever, and a spring-actuated pawl 25 is carried by the lever 23 and is adapted to engage the teeth of the segment 24, whereby the said lever 23 may be retained in an adjusted position. The forward portion of the lever 23 projects beyond the fulcrum point, and a link 26 is pivotally connected at its lower end with the cross-bar 17 and at its upper or intermediate portion engages the forward projecting portion of the lever 23. It is by this means that when the lever 23 is swung the forward end portions of the beams 10 may be raised or lowered as desired, and also by swinging the lever 13 the rear end portions of the said beams 10, together with the shares 11 carried thereby, may be raised or lowered.

As illustrated in Figs. 1 and 2 of the drawings, the parts are so arranged that the mold boards of the shares 11 will cast the earth toward each other, and the mold boards are so arranged when it is designed to use the implement for the purpose of forming a tunnel of earth at the surface of the soil as above indicated. Chains 27 are attached at their forward ends to the opposite sides of the frame 1, and at their rear ends are attached to the forward portion of a core 28. The said core 28 is prismatic or triangular in cross section, and at one flat side is adapted to move along the surface of the soil. The under portion of the lower side of the said core is slightly beveled, as indicated at 29, while the upper forward portion of the core is provided with a dividing board or plate 30, which projects from the center of the core at the angle formed at the meeting edges of the sides of the core.

A stub shaft 31 is journaled for rotation upon the frame 1, and is provided at one end with a sprocket wheel 32. A sprocket wheel 33 is concentrically arranged with one of the wheels 6 and is connected with the same by means of a sleeve or shaft 34, whereby the said sprocket wheel 33 rotates in unison with the said wheels 6. A sprocket chain 35 passes around the sprocket wheels 32 and 33 and is adapted to transmit rotary movement from the wheels 6 to the stub shaft 31.

A trip 36 is journaled upon the rear portion of the frame 1 and is provided with an angularly disposed portion 37 which lies in the path of movement of a finger 38 which projects laterally from the inner end of the stub shaft 31. The opposite end portion of the said trip 36 is radially disposed as at 39, with relation to the shaft 31 and a chain 40 is connected at its upper end with the extremity 39 of the trip 36, and the lower end of the said chain is connected to the upper middle portion of a slicker or smoother 41. The said slicker or smoother 41 is approximately in the shape of a saddle, and is adapted to come in contact with the top and sides of a tunnel which is formed by the core 28, or, rather, by the earth which is cast upon the said core by the mold boards of the shares 11. Chains 42 are connected at their upper forward ends with the frame 1, and at their lower rear ends are connected with the forward side portions of the slicker or smoother 41.

From the above description it will be seen that as the implement is moved along the ground the earth is engaged by the mold boards of the shares 11 and cast laterally toward the outer sides of the core 26. As the said core is moving in unison with the shares 11 it is drawn from under the earth which previously is cast upon its upper side, and thus the earth is left in the form of a tunnel at the surface of the soil, and, inasmuch as the slicker 41 follows behind the said core 28, the said slicker comes in contact with the top and sides of the tunnel and smooths the same. By reason of the fact that the extremity 39 of the trip 36 lies in the path of movement of the finger 38 carried by the stub shaft 31, and inasmuch as the said shaft 31 is rotated through the instrumentality of the sprocket wheels and chain 35 as above indicated, at each time that the said finger 38 comes in contact with the projecting end portion 37 of the trip 36, the said trip is partially rotated and its extremity 39 is caused to move about the axis of the intermediate portion of the said trip. Thus the chain 40 is moved longitudinally and the slicker 41 is given a slight vertical movement, which has a tendency to compact the soil about the rear end portion of the core 28, and also to prevent the soil or trash from accumulating at the forward end portion of the said slicker 41.

When it is desired to use the implement for the purpose of throwing soil toward the roots of adjacent rows of plants the core 28 and the slicker 41 are removed, and the beams 10 are disconnected from the end portions of the cross-bar 17 and are connected with lugs 43, attached at the intermediate portion of the said cross-bar 17. When the beams are so positioned the landsides of the two shares 11 are placed adjacent each other, so that the mold boards of the said shares are at the outer sides of the digger thus formed. Thus, as the implement is drawn along, the shares will engage the soil and the mold boards thereof will cast the same laterally as indicated. Frequently, when this is done, it is desirable to provide means for crushing clods or large particles of earth in the furrow thus opened, and, in the present instance, the provision for this means consists of a lever 44, which is fulcrumed to the frame 1. A gear segment 45 is mounted concentric with the fulcrum point of the said lever, and the lever is provided with a spring-actuated pawl 46, which is adapted to engage the teeth of the said segment 45. The lever 44 is provided with an angularly disposed working end portion 47. A rod 48 is pivotally connected at its upper end with the extremity of the portion 47 of the lever 44. Arms 49 are pivotally connected at their upper ends with the rear portion of the frame 1, and the lower end of the rod 48 slidably engages the said rod 49. A coil spring 50 is interposed between a stop 51, mounted upon the rod 48, and the lower portions of the arms 49, and the said spring 50 is under tension with a tendency to hold the arms 49 in depressed position. A roller 52 is journaled for rotation between the lower ends of the arms 49, and shafts 53 are pivotally connected at their inner ends with the extremities of the said arms 49. Cone-shaped rollers 54 are journaled upon the shafts 53 or are otherwise rotatably supported at the ends of the arms 49.

When the shares 11 are positioned as above described and are used for a purpose of opening a furrow, the earth removed from which is back-set toward the standing plants, as indicated, the roller 52 travels in the bottom of the furrow and has a tendency to crush clods left therein, while the conical rollers 54 mounted upon the pivoted shafts 53 serve as crushers, and operate upon the soil at the sides of the furrow, and reduce the clods and large lumps to a broken or pulverized state. Also it will be seen that inasmuch as the arms 49 are held down under the tension of the spring 50, should the roller 52 engage a large object, as a stone or other obstruction, it may ride over the same against the tension of the spring 50, and arms 49 may swing up at their lower ends, thus permitting the said roller 52 to pass over such an object without damaging the attachments or the parts of the implement.

Having described my invention, what I claim as new, and desire to secure, by Letters Patent, is—

1. A plow comprising shares arranged to cast soil toward a center line, and a core tethered to the plow and arranged to move with the shares and located in the soil casting zone of the shares.

2. A plow comprising shares arranged to cast soil toward a center line, a core tethered to the plow and arranged for movement with the shares and located in the soil casting zone of the share, and a slicker arranged for movement with the core.

3. A plow comprising shares, a core arranged for movement with the shares, a slicker arranged for movement with the core, and means for moving the said slicker in an upward direction.

4. A plow comprising a wheel-supported frame, beams attached to the frame, means for raising and lowering the beams, a core tethered to the frame and located between the beams, and a slicker tethered to the frame and following the core.

5. A plow comprising a wheel-supported frame, plows located at the opposite sides thereof, means mounted upon the frame for raising and lowering the plows, a core tethered to the frame and located between the plows, a slicker tethered to the frame and following the core.

6. A plow comprising a wheel-supported frame, plow-shares located at the opposite sides thereof, a core tethered to the frame and located between the shares, a slicker tethered to the frame and following the core, and means mounted upon the frame for moving the slicker in an upward direction as the frame advances.

In testimony that I claim the foregoing as my own, I have hereto affixed my signature in the presence of two witnesses.

ALBERT G. HERMANSON.

Witnesses:
JESSE S. FIELD,
L. R. CODWELL.